United States Patent
Wang et al.

(10) Patent No.: US 11,823,053 B2
(45) Date of Patent: Nov. 21, 2023

(54) METHOD OF NEURAL NETWORK MODEL COMPUTATION-ORIENTED INTERMEDIATE REPRESENTATION BY CONSTRUCTING PHYSICAL COMPUTATION GRAPH, INFERRING INFORMATION OF INPUT AND OUTPUT TENSOR EDGES OF EACH NODE THEREIN, PERFORMING MEMORY OPTIMIZATION ON TENSOR EDGES, AND OPTIMIZING PHYSICAL COMPUTATION GRAPH

(71) Applicant: ZHEJIANG LAB, Hangzhou (CN)

(72) Inventors: Hongsheng Wang, Hangzhou (CN); Wei Hua, Hangzhou (CN); Weiqiang Jia, Hangzhou (CN); Hujun Bao, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 0 days.

(21) Appl. No.: 17/714,454

(22) Filed: Apr. 6, 2022

(65) Prior Publication Data
US 2023/0259774 A1  Aug. 17, 2023

(30) Foreign Application Priority Data
Feb. 17, 2022  (CN) .......................... 202210144108.2

(51) Int. Cl.
*G06N 3/082*  (2023.01)
*G06N 3/04*  (2023.01)

(52) U.S. Cl.
CPC .............. *G06N 3/082* (2013.01); *G06N 3/04* (2013.01)

(58) Field of Classification Search
CPC ................................. G06N 3/082; G06N 3/04
See application file for complete search history.

(56) References Cited

U.S. PATENT DOCUMENTS

| | | | |
|---|---|---|---|
| 2018/0322385 | A1 | 11/2018 | Yehezkel Rohekar et al. |
| 2019/0391796 | A1 | 12/2019 | Brady et al. |
| 2020/0242189 | A1 | 7/2020 | Chatterjee et al. |
| 2021/0390460 | A1 | 12/2021 | Nimmagadda et al. |
| 2022/0327637 | A1* | 10/2022 | Shah ........................ G06N 3/02 |

(Continued)

FOREIGN PATENT DOCUMENTS

| | | |
|---|---|---|
| CN | 111488211 A | 8/2020 |
| CN | 111723935 A | 9/2020 |
| CN | 111930519 A | 11/2020 |

(Continued)

*Primary Examiner* — Alexey Shmatov
*Assistant Examiner* — Robert Bejcek, II
(74) *Attorney, Agent, or Firm* — IPro, PLLC

(57) ABSTRACT

The disclosure discloses a method of neural network model computation-oriented intermediate representation and apparatus thereof. The method includes the following steps: S1, parsing an input model file so as to acquire topological structure information of a neural network; S2, constructing a logical computation graph; S21, inferring physical layout information of each operator in the logical computation graph; S22, inferring meta attributes of each operator in the logical computation graph; S23, inferring description information of input and output logical tensors of each operator in the logical computation graph; S3, constructing a physical computation graph; S31, generating a physical computation graph, etc.

13 Claims, 8 Drawing Sheets

(56) References Cited

U.S. PATENT DOCUMENTS

| | | | | |
|---|---|---|---|---|
| 2023/0089148 A1* | 3/2023 | Dai | ........................ | G06V 20/17 |
| | | | | 382/103 |
| 2023/0133683 A1* | 5/2023 | Xie | .................... | G06Q 30/0241 |
| | | | | 706/21 |

FOREIGN PATENT DOCUMENTS

| | | | |
|---|---|---|---|
| CN | 112084038 A | 12/2020 |
| CN | 112465108 A | 3/2021 |
| CN | 113095474 A | 7/2021 |
| CN | 113313241 A | 8/2021 |
| CN | 113918351 A | 1/2022 |
| CN | 113994350 A | 1/2022 |
| EP | 3923199 A4 | 12/2021 |
| WO | 2020182989 A1 | 9/2020 |
| WO | 2021141716 A1 | 7/2021 |
| WO | 2021190127 A1 | 9/2021 |
| WO | 2021190761 A1 | 9/2021 |

\* cited by examiner

| Operator attribute | Logical tensor graph(2,2) | Physical tensor graph | |
|---|---|---|---|
| | | Physical device 1 | Physical device 2 |
| Splitting | 5,6,7,8 | 5,6 (top), _,_ (bottom) | _,_ (top), 7,8 (bottom) |
| Broadcasting | 5,6,7,8 | 5,6,7,8 | 5,6,7,8 |
| Local summation | 5,6,7,8 | 5,0,7,0 | 0,6,0,8 |

Fig. 4

| Connection between two physical modes | Physical layout information of two physical nodes | |
|---|---|---|
| | Same device | Different devices |
| One to one direct connection | Device 0: Operator a0 → X → Operator b0; Device 1: Operator a1 → X → Operator b1 | Device 0: Operator a0 → X → Operator b0; Device 1: Operator a1 → X → Copy from device to host → Network transmission → Copy from host to device → Operator b1 (Device 2) |

Fig. 5

METHOD OF NEURAL NETWORK MODEL COMPUTATION-ORIENTED INTERMEDIATE REPRESENTATION BY CONSTRUCTING PHYSICAL COMPUTATION GRAPH, INFERRING INFORMATION OF INPUT AND OUTPUT TENSOR EDGES OF EACH NODE THEREIN, PERFORMING MEMORY OPTIMIZATION ON TENSOR EDGES, AND OPTIMIZING PHYSICAL COMPUTATION GRAPH

CROSS-REFERENCE TO RELATED APPLICATIONS

The present disclosure claims the benefit of priority to Chinese Application No. 202210144108.2 filed on Feb. 17, 2022 to China National Intellectual Property Administration and entitled "METHOD OF NEURAL NETWORK MODEL COMPUTATION-ORIENTED INTERMEDIATE REPRESENTATION AND APPARATUS THEREOF", of which is incorporated herein by reference in this disclosure in its entirety.

TECHNICAL FIELD

The present disclosure relates to the field of deep learning, in particular, to a method of neural network model computation-oriented intermediate representation and apparatus thereof.

BACKGROUND

With the rapid development of the industrial application of artificial intelligence, the demand for large models in practical application scenarios has become more and more urgent. Most of the existing deep learning frameworks provide efficient interfaces for neural network model computation-oriented expressions and trainings of neural network models on a single device. However, existing deep learning operating systems may not be flexible and effective when targeting new distributed devices for a large-scale deep neural network model training, because these distributed devices require more complex parallelism devices than a single device. In addition, the developed distributed training interfaces enhance the model parallelism of existing deep learning frameworks, but it complicates the use and implementation of distributed deep learning.

SUMMARY

The objective of the present disclosure is to provide a method of neural network model computation-oriented intermediate representation and apparatus thereof, so as to overcome the deficiencies in the prior art.

To fulfill the foregoing objective, the present disclosure provides the following technical solution.

The present disclosure provides a method of neural network model computation-oriented intermediate representation, including the following steps:

S1, parsing an input model file so as to acquire topological structure information of a neural network: parsing a user-defined function body including input and output parameters, and compiling the function body into a computation graph composed of logical computation expressions, wherein the logical computation expressions are referred to as operators for short;

S2, constructing a logical computation graph;

S21, inferring physical layout information of each operator in the logical computation graph;

S22, inferring meta attributes of each operator in the logical computation graph;

S23, inferring description information of input and output logical tensors of each operator in the logical computation graph;

S3, constructing a physical computation graph: generating a physical computation graph according to the logical computation graph;

S31, generating each node of the physical computation graph;

S32, generating input and output tensor edges of each node of the physical computation graph;

S4, inferring information of the input and output tensor edges of each node in the physical computation graph;

S5, executing a process of constructing each physical node;

S6, designing a three-level memory structure of the tensor edge in the physical computation graph;

S61, allocating a whole block of a first-level memory at a time in advance before the physical computation graph is executed;

S62, requesting a required second-level memory from the first-level memory by each subgraph execution engine during operation according to a memory offset corresponding to a memory size required by each subgraph, wherein the second-level memory is a sub-memory of the first-level memory;

S63, requesting a memory required by the input and output tensor edges of each computation node in each subgraph from the second-level memory corresponding to the respective subgraph, wherein the memory required by the tensor edges of each node is a third-level memory;

S7, performing memory optimization on the tensor edges in the physical computation graph;

S71, performing memory sharing on the tensor edges in the physical computation graph;

S72, performing memory multiplexing on the tensor edges in the physical computation graph; and S8, optimizing the physical computation graph.

Preferably, the logical computation graph in the step S21 is a topological structure composed of logical computation expressions, which stores all nodes composed of computation expressions and tensor connection edges that are produced and consumed between the nodes in this graph, and the physical layout information represents information of a corresponding machine and device to which the current logical operator is to be deployed in the future during the construction of the logical computation graph.

Preferably, the meta attributes of each operator in the logical computation graph in the step S22 refer to a mapping relationship between the input and output tensors of each logical operator and the input and output tensors of each physical operator, and the meta attributes are a list of valid attributes included in each operator, to describe a mapping relationship between the input and output tensors of one logical operator and the input and output tensors of multiple physical operators on respective devices.

Preferably, the meta attributes include the following three types of attributes.

Splitting attribute: the splitting attribute of each operator indicates that a physical tensor is obtained by splitting a logical tensor according to a specified dimension, and the splitting attribute has parameters representing the slice dimension. The logical tensor may be restored by splicing multiple physical tensors according to the splitting dimension.

Broadcasting attribute: the broadcasting attribute of each operator indicates that a physical tensor is exactly the same as a logical tensor, and also indicates that each physical operator needs data of the entire logical tensor.

Local summation attribute: the local summation attribute of each operator indicates that the shape of a physical tensor is consistent with the shape of a logical tensor, but values in the physical tensor are part of those at corresponding positions in the logical tensor, and the logical tensor may be restored by adding multiple physical tensors according to the corresponding positions.

Preferably, the specific process of the step S23 is: inferring shape and data type information of the input and output logical tensors of the current logical operator by using the meta attributes of distribution information of each operator.

Preferably, the specific process of the step S31 is: traversing each logical node of the logical computation graph, and generating physical computation nodes with a topological order according to the physical layout information of each logical node.

Preferably, the specific process of the step S32 is: traversing each logical tensor edge of the logical computation graph, and according to the types of the front and back logical nodes, generating a connection edge of physical computation nodes corresponding to the logical nodes and a new node composition.

Preferably, the specific process of generating a connection edge of the physical computation nodes corresponding to the logical nodes is as follows: the physical layout information of the currently connected two front and back nodes is traversed, and whether the two nodes are on the same device is determined according to the physical layout information of the two nodes: when two connected physical nodes are on the same device, an internal connection tensor edge uses a one-to-one direct connection mode; and when two physical computation nodes are not on the same device, transmission nodes are inserted such that a one-to-one directly connected target node may acquire a corresponding tensor, wherein the transmission nodes include a node copied from a device side to a host side, a network transmission node, and a node copied from the host side to the device side.

Preferably, the specific process of the step S4 is as follows:

S41, generating an input tensor edge of each physical node, which refers to allocating an input tensor from a memory to each physical node, and binding the input tensor to the input tensor edge of each physical node; and S42, generating an output tensor edge of each physical node, which refers to allocating an output tensor from the memory to each physical node, and binding the output tensor to the output tensor edge of each physical node.

Preferably, the sub-steps of the step S5 are as follows:

S51, constructing each physical node: creating a new physical node according to the operators in the logical computation graph;

S52, binding the input and output tensor edges of each physical node: maintaining one or more logical tensor identity fields inside a tensor consumed by the input tensor edge and a tensor produced by the output tensor edge of each physical node to identify one tensor, and binding the identity fields inside the tensor to the identity fields inside the logical node on a one-to-one basis during the construction of the physical node; and S53, inferring description information of tensor edges in each physical computation graph: inferring description information of the tensor edges in each physical computation graph and storing the description information into corresponding tensor information.

Preferably, performing memory sharing on the tensor edges in the physical computation graph in the step S71 refers to that the output tensor edge of the physical node in the physical computation graph directly performs in-place computation in the memory of the original input tensor edge, and directly modifies the value of the input tensor of the physical node, and the process of performing memory sharing on the tensor edges in the physical computation graph includes the following sub-steps:

S711, collecting memory-shared physical nodes: traversing all the nodes in the physical computation graph of the entire network according to the topological order to find nodes that satisfy that there is an input-output relationship between two front and back nodes and are all in the same device, then marking the memory of the connection tensor edge between the two front and back nodes to be 0; if there is no input-output relationship, marking the memory of the connection tensor edge between the two nodes to be 1, and then generating a marked physical node topological sequence according to the marked memory; and S712, allocating shared memory, there being multiple nodes on each marked physical node topological sequence, checking whether there is a memory sharing operation between the input and output nodes, if so, making a memory sharing mark, and multiplexing the output of the current node by the input of the next node.

Preferably, performing memory multiplexing on the tensor edges in the physical computation graph in the step S72 refers to that for memories with non-overlapping life cycles, the memory used later may multiplex the memory that has been used up earlier, and the specific steps are as follows:

S721, constructing a mapping table of mutually exclusive memories, traversing all memories, acquiring a start point and an end point of a life cycle of each memory, reserving mutually exclusive points of two memories with overlapping life cycles, and constructing a hash table of mutually exclusive memories; and S722, allocating a multiplexed memory, wherein the multiplexed memory refers to a memory that satisfies a memory multiplexing condition, and the memory multiplexing condition refers to that the life cycles of the two memories do not overlap, that is, there is no mutual exclusion relationship between the two memories. The hash table of mutually exclusive memories constructed above is traversed; for two memories without mutual exclusion relationship, only one memory needs to be allocated, the size of the allocated memory is equal to that of the larger one of the two memories, the smaller memory can multiplex the larger one of the two memories, and a label of the multiplexed memory is marked; and for two memories with mutual exclusion relationship, after the former memory is allocated, when the latter memory is allocated, the offset continues to be expanded to the size of the latter memory after the offset of the former memory.

Preferably, the sub-steps of the step S8 are as follows:

S81, removing an empty tensor edge, which refers to that after the physical computation graph is constructed, the tensor allocated in advance from the memory is still not consumed, and in order to reduce memory overhead, the empty tensor edge is removed; and S82, inferring the number of times to produce tensors when the entire network executes a single batch of data, which indicates the number of times required to produce tensors when the entire network executes one batch of data.

The present disclosure further discloses a neural network model computation-oriented intermediate representation apparatus, including a parsing unit, a logical computation graph generation unit, a physical computation graph generation unit, a memory allocation unit, a memory optimization unit and a graph optimization unit, wherein the parsing unit is used for parsing an input model file so as to acquire topological structure information of a neural network;

the logical computation graph generation unit is used for inferring physical layout information, meta attributes and description information of input and output logical tensors of each operator in a logical computation graph compiled by the parsing unit, and generating a graphical logical computation graph intermediate representation;

the physical computation graph generation unit is used for constructing and inferring information of input and output tensor edges of each node in a physical computation graph and executing a process of constructing each physical node; and inputting the graphical logical computation graph intermediate representation, which is obtained by the logical computation graph generation unit and used for network model computation, mapping the logical computation graph to a specific computation task, and generating a graphical abstract intermediate representation for the computation task;

the memory allocation unit is used for allocating a memory according to a three-level memory structure of the tensor edges in the physical computation graph;

the memory optimization unit uses memory sharing and memory multiplexing techniques to optimize the memory required by the tensor edges in the physical computation graph; and the graph optimization unit optimizes the physical computation graph by sensing resource changes, inferring the number of times to produce tensors when the entire network executes a single batch of data and removing empty tensor edges.

Preferably, the parsing unit is specifically used for parsing a user-defined function body including input and output parameters, and compiling the function body into a computation graph composed of logical computation expressions.

Preferably, the logical computation graph generation unit is used for inferring the physical layout information of each operator in the logical computation graph, the meta attributes including splitting, broadcasting and local summation, and the description information of the input and output logical tensors of each operator; inputting the operators and the input and output tensors of the operators in the topological structure information of the network model obtained by the parsing unit to serve as nodes and edges respectively; and according to user-defined different models and heterogeneous clusters, on the basis of the meta attributes and physical layout of the operators, natively performing, by abstract intermediate representation for distributed training-oriented neural network model computation, splitting and resource configuration on the model from an operator level, so as to generate the graphical logical computation graph intermediate representation.

Preferably, the memory allocation unit adopts a three-level memory structure: a first-level memory is a one-time allocated memory before the physical computation graph generation unit constructs and infers the physical computation graph; a second-level memory is a required memory allocated from the first-level memory by a subgraph execution engine of the physical computation graph during operation; and a third-level memory is a memory that is allocated from the second-level memory and required by the input and output tensor edges of each computation node inside a subgraph of the physical computation graph.

The present disclosure further discloses an apparatus of generating neural network model computation-oriented intermediate representation, including a memory and one or more processors, wherein the memory stores executable codes, and when the one or more processors execute the executable code, the method of neural network model computation-oriented intermediate representation is implemented.

The beneficial effects of the present disclosure are as follows: the present disclosure provides a simple and easy-to-use method of deep neural network computation-oriented intermediate representation and apparatus thereof. For various parallel modes, provided is meta attributes-based abstract new intermediate representation for neural network model computation for distributed training. The meta attribute-based intermediate representation for neural network model computation disclosed in the present disclosure natively supports data parallelism, model parallelism and pipeline parallelism from an operator level. The method of neural network model computation-oriented intermediate representation and apparatus thereof disclosed in the present disclosure implement a computation process of a neural network model in a graphical manner by taking computation expressions as basic units, and taking tensors as data flowing in a computation graph composed of the entire computation expressions. In the large-scale distributed application scenario of a deep neural network, the present disclosure has a low threshold for users, and enables the model to learn the intrinsic correlation of a large number of data flowing into the neural network in batches, thereby obtaining the "intelligent" perception and judgment ability in the corresponding scenario. The present disclosure provides a concise and easy-to-use neural network model compilation apparatus for algorithm engineers related to deep learning, such that a deep learning model can be conveniently constructed to perform conversion and description between different formats of the deep learning model, iterative optimization, and flexible deployment.

BRIEF DESCRIPTION OF THE DRAWINGS

FIG. 4 is a schematic diagram of meta attributes of each operator in a logical computation graph;

FIG. 5 is a schematic diagram of a direct connection mode of two physical nodes;

DETAILED DESCRIPTION OF THE EMBODIMENTS

In order to make the objective, the technical solutions and the advantages of the present disclosure clearer, the present disclosure is further described in detail below via the accompanying drawings and embodiments. However, it should be understood that the specific embodiments described herein are merely used to explain the present disclosure, but not intended to limit the scope of the present disclosure. Furthermore, in the following illustration, descriptions of well-known structures and techniques are omitted so as to avoid unnecessarily obscuring the concept of the present disclosure.

An embodiment of the present disclosure provides a method of neural network model computation-oriented intermediate representation and apparatus thereof, and provides a method capable of acquiring and parsing a topological structure of an input deep learning neural network model, and a generation method and apparatus capable of converting a neural network computation-oriented topological structure into an intermediate representation constituted based on computation expressions between tensors. The intermediate representation method and apparatus for neural network model computation involve inputting a user-defined function body including input and output parameters, compiling the function body into a computation graph composed of logical computation expressions, and generating an intermediate representation that can be directly read by a computation graph execution engine and generates a runtime execution graph.

Figure 1:
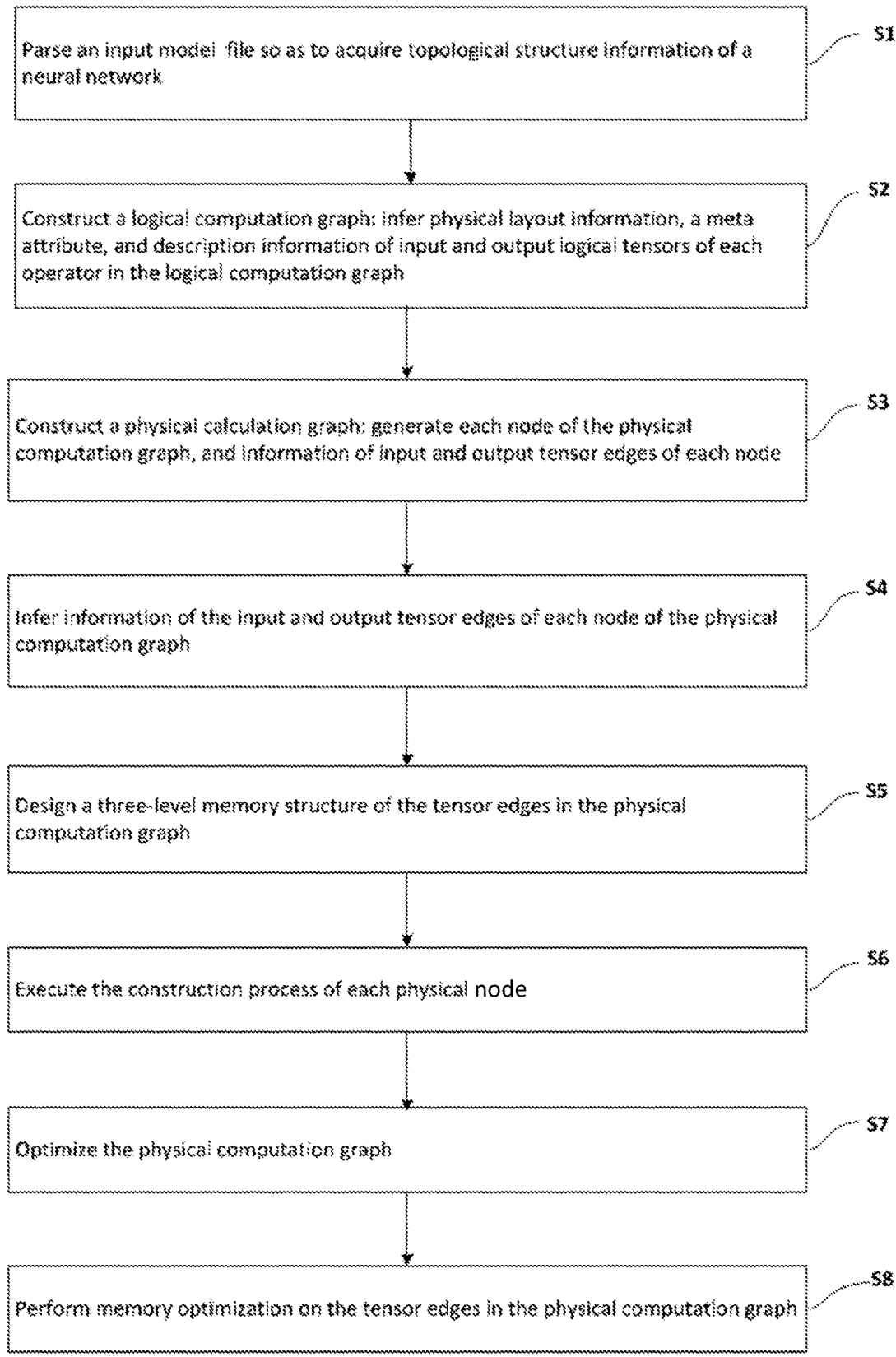
FIG. 1 is a flow chart of main steps of a method of neural network model computation-oriented intermediate representation.

As shown in FIG. 1, an embodiment of the present disclosure provides a method of neural network model computation-oriented intermediate representation, including the following steps:

S1, parsing an input model file so as to acquire topological structure information of a neural network: parsing a user-defined function body including input and output parameters, and compiling the function body into a computation graph composed of logical computation expressions, wherein the logical computation expressions are referred to as operators for short;

S2, constructing a logical computation graph;

S21, inferring physical layout information of each operator in the logical computation graph;

S22, inferring meta attributes of each operator in the logical computation graph;

S23, inferring description information of input and output logical tensors of each operator in the logical computation graph;

S3, constructing a physical computation graph: generating a physical computation graph according to the logical computation graph;

S31, generating each node of the physical computation graph;

S32, generating input and output tensor edges of each node of the physical computation graph;

S4, inferring information of the input and output tensor edges of each node in the physical computation graph;

S5, executing a process of constructing each physical node;

S6, designing a three-level memory structure of the tensor edges in the physical computation graph;

S61, allocating a whole block of a first-level memory at a time in advance before the physical computation graph is executed;

S62, requesting a required second-level memory from the first-level memory by each subgraph execution engine during operation according to a memory offset corresponding to a memory size required by each subgraph, wherein the second-level memory is a sub-memory of the first-level memory;

S63, requesting a memory required by the input and output tensor edges of each computation node in each subgraph from the second-level memory corresponding to the respective subgraph, wherein the memory required by the tensor edges of each node is a third-level memory;

S7, performing memory optimization on the tensor edges in the physical computation graph;

S71, performing memory sharing on the tensor edges in the physical computation graph;

S72, performing memory multiplexing on the tensor edges in the physical computation graph; and S8, optimizing the physical computation graph.

Figure 2:
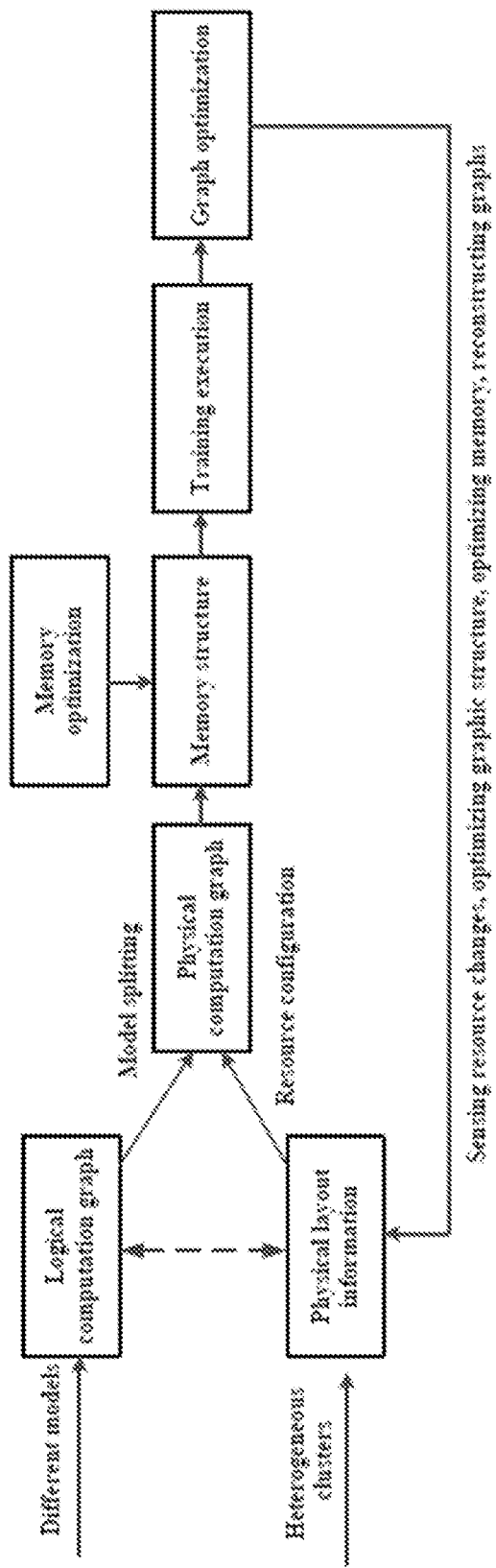
FIG. 2 is an architectural diagram of a method of neural network model computation-oriented intermediate representation.

FIG. 2 shows an architectural diagram of a method of neural network model computation-oriented intermediate representation. On the basis of the two unified representations of the logical computation graph and the physical computation graph, arbitrary model and resource input are supported; and according to a dynamic change in the input, a deep learning framework is triggered to automatically update learning parameters of a deep learning model in an end-to-end manner. The method of neural network model computation-oriented intermediate representation includes: parsing a user-defined function body including input and output parameters, compiling the function body into a computation graph composed of logical computation expressions, and generating an intermediate representation that can be directly read by a computation graph execution engine and generates a runtime execution graph, wherein the logical computation expressions are referred to as operators for short hereinafter.

The logical computation graph in the step S21 is a topological structure composed of logical computation expressions, which stores all nodes composed of computation expressions and tensor connection edges that are produced and consumed between the nodes in this graph, and the physical layout information represents information of a corresponding machine and device to which the current logical operator is to be deployed in the future during the construction of the logical computation graph.

Figure 3:
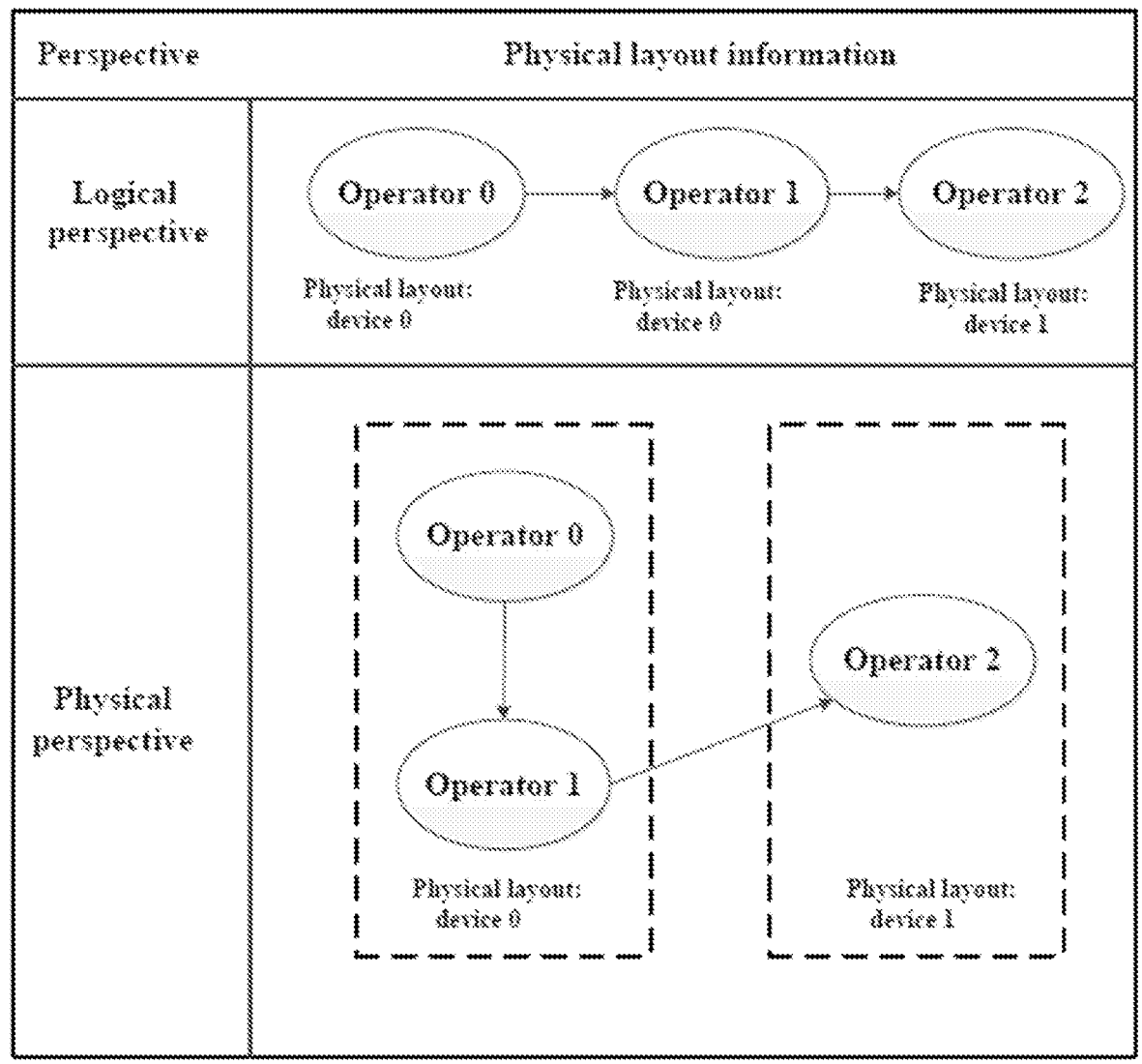
FIG. 3 is a schematic diagram of a process of inferring physical layout information of each operator in a logical computation graph.

As shown in FIG. 3, in the process of inferring the physical layout information of each operator in the logical computation diagram, a user defines a network composed of 3 operators, wherein the physical layout information of operator 0 and operator 1 is device 0, the physical layout information of operator 2 is device 1.

The meta attributes of each operator in the logical computation graph in the step S22 refers to a mapping relationship between the input and output tensors of each logical operator and the input and output tensors of each physical operator, and the meta attributes are a list of valid attributes included in each operator, to describe a mapping relationship between the input and output tensors of one logical operator and the input and output tensors of multiple physical operators on respective devices.

The meta attributes include the following three types of attributes: splitting, broadcasting and local summation.

Splitting attribute: the splitting attribute of each operator indicates that a physical tensor is obtained by splittng a logical tensor according to a specified dimension, and the splitting attribute has a parameter representing a splitting dimension. If multiple physical tensors are spliced according to the splitting dimension, the logical tensor may be restored.

Broadcasting attribute: the broadcasting attribute of each operator indicates that a physical tensor is exactly the same as a logical tensor, and also indicates that each physical operator needs data of the entire logical tensor.

Local summation attribute: the local summation attribute of each operator indicates that the shape of a physical tensor is consistent with the shape of a logical tensor, but values in the physical tensor are part of those at corresponding positions in the logical tensor; if multiple physical tensors are added according to the corresponding positions, the logical tensor may be restored.

After the logical computation graph constructed by the user is determined, when the deep learning framework generates a distributed physical execution graph, an attribute list of legitimate distribution information allowed by each operator is firstly inferredd; and an attribute with a minimum transmission overhead is selected from the attribute list as a distribution policy for this training, and is used for guiding a deep learning framework compiler to generate the most efficient execution graph. FIG. 4 shows meta attributes of each operator in the logical computation graph.

Inferring the description information of the input and output logical tensors of each operator in the logical computation graph in the step S23 is specifically as follows: inferring shape and data type information of the input and output logical tensors of the current logical operator by using the meta attributes of distribution information of each operator.

In the step S3, the physical computation graph describes the full view of the entire runtime computation graph, and the process of constructing the physical computation graph is a process of generating the physical computation graph according to the logical computation graph. The sub-steps of the step S3 are as follows:

S31, generating each node of the physical computation graph, specifically, traversing each logical node of the logical computation graph, and generating physical computation nodes with a topological order according to the physical layout information of each logical node; and S32, generating input and output tensor edges of each node of the physical computation graph, specifically, traversing each logical tensor edge of the logical computation graph, and according to the types of the front and back logical nodes, generating a connection edge of physical computation nodes corresponding to the logical nodes and a new node composition. The process of inferring and generating, according to the types of the front and back logical nodes, the connection edge of corresponding physical nodes is as follows:

a connection tensor edge of corresponding physical nodes is inferred and generated by adopting a one-to-one direct connection mode. Due to the meta attributes of splitting, broadcasting and local summation of the nodes at two ends of the logical tensor edge, the way of viewing the intermediate logical tensor is exactly the same. In the common case of data parallelism, forward and backward operators are directly connected in a one-to-one manner. The physical layout information of the currently connected two front and back nodes is traversed, and whether the two nodes are on the same device is determined according to the physical layout information of the two nodes: when two connected physical nodes are on the same device, an internal connection tensor edge adopts a one-to-one direct connection mode; and when two physical computation nodes are not on the same device, transmission nodes are inserted such that a one-to-one directly connected target node may acquire a corresponding tensor, wherein the transmission nodes include a node copied from a device side to a host side, a network transmission node, and a node copied from the host side to the device side.

FIG. 5 shows two cases of the one-to-one direct connection mode. The left side of FIG. shows an internal one-to-one direct connection mode when two physical nodes are on the same device. The right side of FIG. 5 shows that when two physical computation nodes are not on the same device, transmission nodes, i.e., a node copied from a device side to a host side, a network transmission node, and a node copied from the host side to the device side, are inserted such that a one-to-one directly connected target node may acquire a corresponding tensor.

After the composition of the physical computation graph is completed, the computation graph is traversed according to the topological order of the physical nodes in the physical computation graph, and various information corresponding to each physical node is sequentially constructed. The sub-steps of the step S4 are as follows:

S41, generating an input tensor edge of each physical node, which refers to allocating an input tensor from a memory to each physical node, and binding the input tensor to the input tensor edge of each physical node; and S42, generating an output tensor edge of each physical node, which refers to allocating an output tensor from the memory to each physical node, and binding the output tensor to the output tensor edge of each physical node.

The sub-steps of the step S5 are as follows:

S51, constructing each physical node: creating a new physical node according to the operators in the logical computation graph;

S52, binding the input and output tensor edges of each physical node: maintaining one or more logical tensor identity fields inside a tensor consumed by the input tensor edge and a tensor produced by the output tensor edge of each physical node to identify one tensor, and binding the identity fields inside the tensor to the identity fields inside the logical node on a one-to-one basis during the construction of the physical node; and S53, inferring description information of tensor edges in each physical computation graph: inferring description information of the tensor edges in each physical computation graph and storing the description information into corresponding tensor information.

Figure 6:
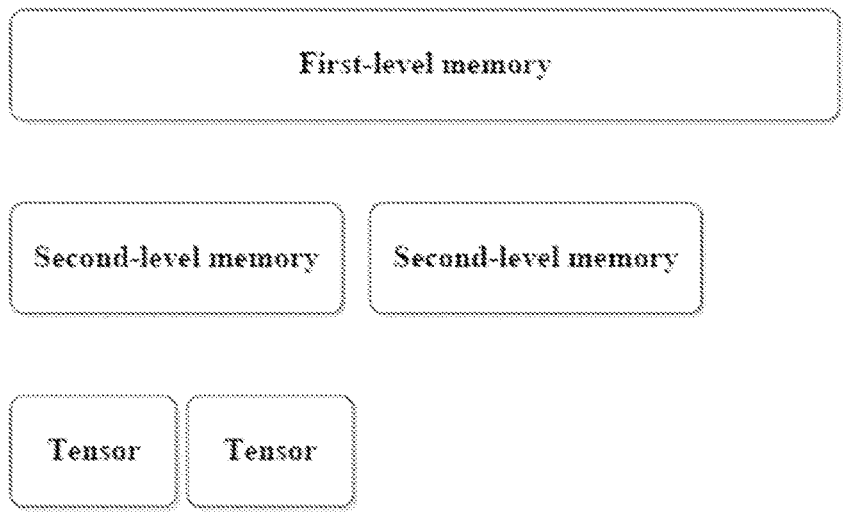
FIG. 6 is a schematic diagram of designing a three-level memory structure of tensor edges in a physical computation graph.

Designing the three-level memory in the step S6 refers to: before the physical computation graph is executed, allocating a whole block of larger memory at a time in advance, wherein the whole block of larger memory is a first-level memory; requesting a required small block of memory from the first-level memory by each subgraph execution engine during operation according to a memory offset corresponding to a memory size required by each subgraph, wherein the small block of memory is a second-level memory; and finally, requesting a memory required by the input and output tensor edges of each computation node in each subgraph being from the second-level memory corresponding to the respective subgraph, wherein the memory required by the tensor edges of each node is a third-level memory. The design of the first-level memory reduces the access times of the host memory, and the design of the second-level memory improves the flexibility of memory scheduling for each physical computation subgraph, thus improving the memory usage efficiency of the entire system. FIG. 6 is a schematic diagram of designing a three-level memory structure of tensor edges in a physical computation graph.

Performing memory sharing on the tensor edges in the physical computation graph in the step S71 refers to that the output tensor edge of the physical node in the physical computation graph directly performs in-place computation in the memory of the original input tensor edge, and directly modifies the value of the input tensor of the physical node. The process of performing memory sharing on the tensor edge in the physical computation graph includes the following sub-steps:

S711, collecting memory-shared physical nodes: traversing all the nodes in the physical computation graph of the entire network according to the topological order to find nodes that satisfy that there is an input-output relationship between two front and back nodes and are all in the same device, then marking the memory of the connection tensor edge between the two front and back nodes to be 0; if there is no input-output relationship, marking the memory of the connection tensor edge between the two front and back nodes to be 1, and then generating a marked physical node topological sequence according to the marked memory; and S712, allocating shared memory, there being multiple nodes on each marked physical node topological sequence, checking whether there is a memory sharing operation between the input and output nodes, if so, making a memory sharing mark, and multiplexing the output of the current node by the input of the next node. For example: node 0→node 1, there is a memory sharing operation between node 0 and node 1, then the input tensor of node 1 multiplexes the output tensor of node 0. Then, for the output of node 0 and the input of node 1, only one memory needs to be allocated.

Performing memory multiplexing on the tensor edge in the physical computation graph in the step S72 refers to that for memories with non-overlapping life cycles, the memory used later may multiplex the memory that has been used up earlier, and the specific steps are as follows:

S721, constructing a mapping table of mutually exclusive memories, traversing all memories, acquiring a start point and an end point of a life cycle of each memory, reserving mutually exclusive points of two memories with overlapping life cycles, and constructing a hash table of mutually exclusive memories; and S721, allocating a multiplexed memory, wherein multiplexed memory refers to a memory that satisfies a memory multiplexing condition, and the memory multiplexing condition refers to that the life cycles of the two memories do not overlap, that is, there is no mutual exclusion relationship between the two memories. The hash table of mutually exclusive memories constructed above is traversed; for two memories a and b without mutual exclusion relationship, only one memory needs to be allocated, the size of the allocated memory is equal to that of the larger one of the two memories a and b. The smaller memory can multiplex the larger one of the two memories, and a label of the multiplexed memory is marked. For two memories a and b with mutual exclusion relationship, if memory a is allocated, when memory b is allocated, the offset continues to be expanded to the size of memory b after the offset of memory a.

Figure 7:
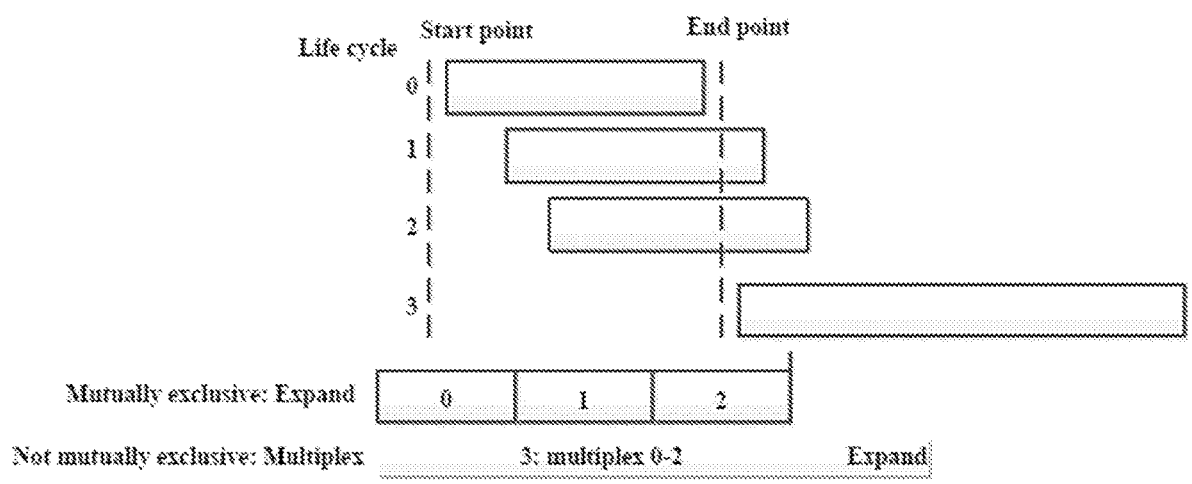
FIG. 7 is a schematic diagram of a memory multiplexing process.

FIG. 7 shows the described memory multiplexing process. The life cycles of memory 0, memory 1 and memory 2 overlap each other, so memory 0, memory 1, and memory 2 are marked as mutually exclusive memories. The life cycles of memory 3 and memory 0 do not overlap, and memory 3 and memory 0 are on the same device, so memory 3 and memory 0 satisfy the memory multiplexing condition. For memory 0, memory 1, and memory 2 that have mutual exclusion relationship, the allocation mode is to continue to expand the offset of the size of memory 1 on the basis of memory 0, and continue to expand the offset of the size of memory 2 on the basis of memory 1. For memory 0 and memory 3 that do not have mutual exclusion relationship, the memory allocation mode is that memory 3 can multiplex the memory of memory 0. If the size of memory 3 is smaller than that of memory 0, memory 3 is directly allocated from memory 0. If the size of memory 3 is greater than that of memory 0, memory 3 firstly multiplexes memory 0, and the part of memory 3 that is larger than memory 0 is applied from a host by means of expansion.

The sub-steps of the step S8 are as follows:

S81, removing an empty tensor edge, which refers to that after the physical computation graph is constructed, the tensor allocated in advance from the memory is still not consumed, and in order to reduce memory overhead, the empty tensor edge is removed; and S82, inferring the number of times to produce tensors when the entire network executes a single batch of data, which indicates the number of times required to produce tensors when the entire network executes one batch of data. The number of times to produce tensors when the entire network executes a single batch of data is two-dimensional data, for example, (1, 1) denotes that the entire network needs to produce tensors once when executing one batch of data. When a broadcasting node is inserted into the network, the tensor will be sent k times, and the number of times to produces tensors when the entire network executes a batch of data is (1, k). The optimization method for inferring the number of times to produce tensors when the entire network executes a single batch of data can statically allocate memory for the tensors required by the physical nodes of the entire network in advance, thereby improving the memory scheduling efficiency of the physical computation graph of the entire network.

Figure 8:
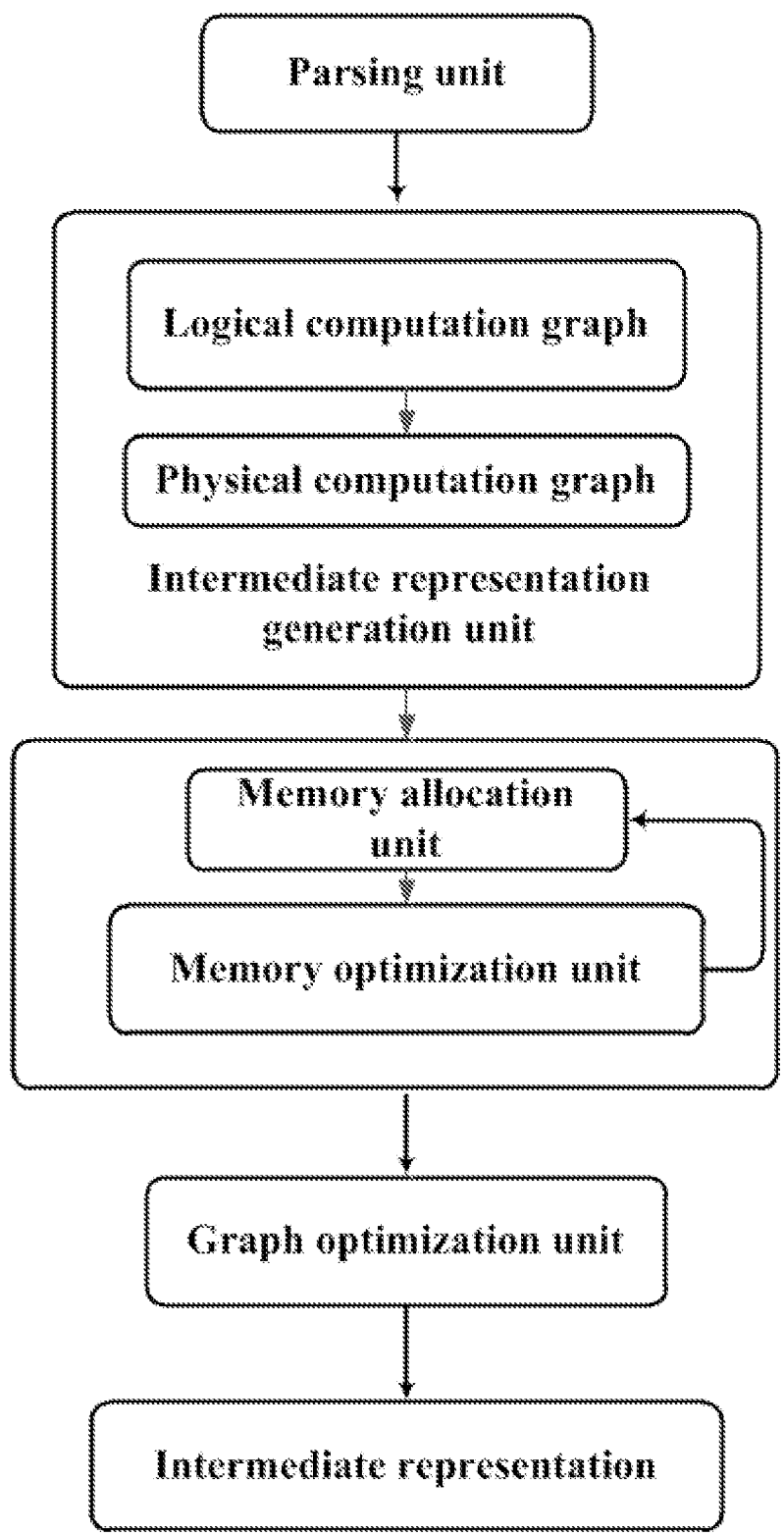
FIG. 8 is a flow chart of an implementation method for an apparatus of generating neural network model computation-oriented intermediate representation and FIG. 9 is a schematic diagram of an apparatus according to an embodiment of the present disclosure.

An embodiment of the present disclosure further provides an apparatus of generating neural network model computation-oriented intermediate representation which serves as a compilation engine for a deep learning framework. The technical solution of the present disclosure will be further described in detail below by taking the implementation process of the apparatus of generating neural network model computation-oriented intermediate representation as an example. FIG. 8 shows a flow chart of an implementation method for an apparatus of generating neural network model computation-oriented intermediate representation.

The implementation process of the apparatus of generating neural network model computation-oriented intermediate representation includes the following steps.

I. A parsing unit parses an input model file so as to acquire topological structure information of a neural network. Specifically, a user-defined function body including input and output parameters is parsed, and the function body is compiled into a computation graph composed of logical computation expressions, wherein the logical computation expressions are referred to as operators for short hereinafter.

II. A logical computation graph generation unit infers physical layout information of each operator in a logical computation graph, meta attributes including splitting, broadcasting, local summation, and description information of input and output logical tensors of each operator. The operators and the input and output tensors of the operators in the topological structure information of the neural network obtained by the parsing unit are input to serve as nodes and edges respectively; and according to user-defined different models and heterogeneous clusters, on the basis of the meta attributes and physical layout of the operators, abstract intermediate representation for distributed training-oriented neural network model computation natively performs splitting and resource configuration on the model from an operator level, so as to generate a graphical logical computation graph intermediate representation.

The logic computation graph generation unit executes three steps as follows.

(1) Physical layout information of each operator in the logical computation graph is inferred.

The logical computation graph is a topological structure composed of logical computation expressions, which stores all nodes composed of computation expressions and tensor connection edges that are produced and consumed between the nodes in this graph; the process of constructing the logical computation graph firstly involves inferring the physical layout information of each operator in the logical computation graph; the physical layout information represents information of a corresponding machine and device to which the current logical operator is to be deployed in the future during the construction of the logical computation graph; and for common data parallelism, all operators are deployed on all devices.

(2) Meta attributes of each operator in the logical computation graph is inferred;

the second step in the process of constructing the logical computation graph is to derive the meta attributes of each operator in the logical computation graph; the meta attributes of each operator in the logical computation graph refers to a mapping relationship between the input and output tensors of each logical operator and the input and output tensors of each physical operator; the meta attributes are list of valid attributes included in each operator, to describe a mapping relationship between the input and output tensors of one logical operator and the input and output tensors of multiple physical operators on respective devices; the meta attributes include three types of attributes: splitting, broadcasting and local summation;

splitting attribute: the splitting attribute of each operator indicates that a physical tensor is obtained by splitting a logical tensor according to a specified dimension, and the splitting attribute has parameters representing a splitting dimension; if multiple physical tensors are spliced according to the splitting dimension, the logical tensor may be restored;

broadcasting attribute: the broadcasting attribute of each operator indicates that a physical tensor is exactly the same as a logical tensor, and also indicates that each physical operator needs data of the entire logical tensor;

local summation attribute: the local summation attribute of each operator indicates that the shape of a physical tensor is consistent with the shape of a logical tensor, but values in the physical tensor are part of those at corresponding positions in the logical tensor; if multiple physical tensors are added according to the corresponding positions, the logical tensor may be restored; and after the logical computation graph constructed by the user is determined, when the deep learning framework generates a distributed physical execution graph, an attribute list of legitimate distribution information allowed by each operator is firstly inferred; and an attribute with a minimum transmission overhead is selected from the attribute list as a distribution policy for this training, and is used for guiding a deep learning framework compiler to generate the most efficient execution graph.

(3) Description information of input and output logical tensors of each operator in the logical computation graph is inferred.

The third step in the process of constructing the logical computation graph is to derive the description information of input and output logical tensors of each operator in the logical computation graph; and the meta attributes of distribution information of each operator is used to derive shape and data type information of the input and output logical tensors of the current logical operator.

III. A physical computation graph generation unit is used for constructing and inferring information of input and output tensor edges of each node in a physical computation graph and executing a process of constructing each physical node; and inputting the graphical logical computation graph intermediate representation which is obtained by the logical computation graph generation unit and used for network model computation, mapping the logical computation graph to a specific computation task, and generating a graphical abstract intermediate representation for the computation task; and three processes are included as follows.

(1) A physical computation graph is generated.

The physical computation graph describes the full view of an entire runtime computation graph. The process of constructing the physical computation graph is a process of generating the physical computation graph according to the logical computation graph. The following sub-steps are included:

(1.1) each node of the physical computation graph is generated; each logical node of the logical computation graph is traversed, and physical computation nodes with a topological order are generated according to the physical layout information of each logical node; and (1.2) input and output tensor edges of each node of the physical computation graph are generated; each logical tensor edge of the logical computation graph is traversed, and according to the types of the front and back logical nodes, a connection edge of physical computation nodes corresponding to the logical nodes and a new node composition are generated; the process that according to the types of the front and back logical nodes, the connection edge of the physical computation nodes corresponding to the logical nodes is as follows: inferring and generating the connection tensor edge of corresponding physical nodes involve the use of a one-to-one direct connection mode; due to the meta attributes of splitting, broadcasting and local summation of the nodes at two ends of the logical tensor edge, the way of viewing the intermediate logical tensor is exactly the same; in the common case of data parallelism, both forward and backward operators are directly connected in a one-to-one manner; the physical layout information of the currently connected two front and back nodes is traversed, and whether the two nodes are on the same device is determined according to the physical layout information of the two nodes: when two connected physical nodes are on the same device, an internal connection tensor edge adopts a one-to-one direct connection mode; and when two physical computation nodes are not on the same device, transmission nodes, i.e., a node copied from a device side to a host side, a network transmission node, and a node copied from the host side to the device side, are inserted such that a one-to-one directly connected target node may acquire a corresponding tensor.

(2) Information of the input and output tensor edges of each node in the physical computation graph is inferred.

After the composition of the physical computation graph is completed, the computation graph is traversed according to the topological order of the physical nodes in the physical computation graph, and various information corresponding to each physical node is sequentially constructed. The process that the information of the input and output tensor edges of each node in the physical computation graph is inferred includes the following sub-steps:

(2.1) an input tensor edge of each physical node is generated, which refers to allocating an input tensor from a memory to each physical node, and binding the input tensor to the input tensor edge of each physical node; and (2.2) an output tensor edge of each physical node is generated, which refers to allocating an output tensor from the memory to each physical node, and binding the output tensor to the output tensor edge of each physical node.

(2.3) A process of constructing each physical node is executed.

(3) Execution of the process of constructing each physical node includes the following sub-steps:

(3.1) each physical node is constructed: execution of the constructing process of each physical node is to create a new physical node according to the operators in the logical computation graph;

(3.2) the input and output tensor edges of each physical node are bound: one or more logical tensor identity fields inside a tensor consumed by the input tensor edge and a tensor produced by the output tensor edge of each physical node are maintained to identify one tensor; the identity fields inside the tensor need to be bound to the identity fields inside the logical node on a one-to-one basis during the construction of the physical node; and (3.3) description information of tensor edges in each physical computation graph is inferred: description information of the tensor edges in each physical computation graph is inferred and stored into corresponding tensor information.

IV. A memory allocation unit is used for allocating a memory according to a three-level memory structure of the tensor edges in the physical computation graph.

The three-level memory design refers to: before the physical computation graph is executed, allocating a whole block of larger memory at a time in advance, wherein the whole block of larger memory is a first-level memory; requesting a required small block of memory from the first-level memory by each subgraph execution engine during operation according to a memory offset corresponding to a memory size required by each subgraph, wherein the small block of memory is a second-level memory; and finally, requesting a memory required by the input and output tensor edges of each computation node in each subgraph from the second-level memory corresponding to the respective subgraphs, wherein the memory required by the tensor edge of each node is a third-level memory.

The design of the first-level memory reduces the access times of a host memory, and the design of the second-level memory improves the flexibility of memory scheduling for each physical computation subgraph, thus improving the memory usage efficiency of the entire system.

V. A memory optimization unit uses the memory sharing and memory multiplexing techniques to optimize the memory required by the tensor edges in the physical computation graph. The memory optimization unit executes two steps as follows.

(1) Memory sharing is performed on the tensor edges in the physical computation graph.

Memory sharing on the tensor edges in the physical computation graph refers to that the output tensor edge of the physical node in the physical computation graph directly performs in-place computation in the memory of the original input tensor edge, and directly modifies the value of the input tensor of the physical node. The optimization process of memory sharing on the tensor edge in the physical computation graph improves the memory usage efficiency. The process that memory sharing is performed on the tensor edges in the physical computation graph includes the following sub-steps.

(1.1) Memory-shared physical nodes are collected. All the nodes in the physical computation graph of the entire network are traversed according to the topological order to find nodes that satisfy that there is an input-output relationship between two front and back nodes and are all in the same device, then the memory of the connection tensor edge between the two nodes is marked as 0; if there is no input-output relationship, the memory of the connection tensor edge between the two nodes is marked as 1. Then, a marked physical node topological sequence is generated according to the marked memory.

(1.2) A shared memory is allocated. There are multiple nodes on each marked physical node topological sequence, and whether there is a memory sharing operation between the input and output nodes is checked. If so, a memory sharing mark is made, and the input of the next node multiplexes the output of the current node. For example: node 0→node 1, there is a memory sharing operation between node 0 and node 1, then the input tensor of node 1 multiplexes the output tensor of node 0. Then, for the output of node 0 and the input of node 1, only one memory needs to be allocated.

(2) Memory multiplexing is performed on the tensor edges in the physical computation graph.

Memory multiplexing is performed on the tensor edges in the physical computation graph, which refers to that for memories with non-overlapping life cycles, the memory used later may multiplex the memory that has been used up earlier, thus reducing the access times of the host memory and improving system memory usage efficiency. The memory multiplexing process comprises the following steps.

(2.1) A mapping table of mutually exclusive memories is constructed. All the memories are traversed, a start point and an end point of a life cycle of each memory are acquired, and mutually exclusive points of two memories with overlapping life cycles are reserved. A hash table of mutually exclusive memories is constructed.

(2.2) A multiplexed memory is allocated: the multiplexed memory refers to a memory that satisfies a memory multiplexing condition, and the memory multiplexing condition refers to that the life cycles of the two memories do not overlap, that is, there is no mutual exclusion relationship between the two memories. The hash table of mutually exclusive memories constructed above is traversed; for two memories a and b without mutual exclusion relationship, only one memory needs to be allocated, the size of the allocated memory is equal to that of the larger one of the two memories a and b. The smaller memory can multiplex the larger one of the two memories, and a label of the multiplexed memory is marked. For two memories a and b with mutual exclusion relationship, if memory a is allocated, when memory b is allocated, the offset continues to be expanded to the size of memory b after the offset of memory a.

VI. A graph optimization unit optimizes the physical computation graph by sensing resource changes, inferring the number of times to produce tensors when the entire network executes a single batch of data and removing an empty tensor edge. The graph optimization unit executes two steps as follows.

(1) Empty tensor edge is removed.

The step that the empty tensor edge is removed refers to that after the physical computation graph is constructed, the tensor allocated in advance from the memory is still not consumed, and in order to reduce memory overhead, the empty tensor edge is removed.

(2) The number of times to produce tensors is inferred when the entire network executes a single batch of data.

The step that the number of times to produce tensors is inferred when the entire network executes a single batch of data indicates the number of times required to produce tensors when the entire network executes one batch of data. The number of times to produce tensors when the entire network executes a single batch of data is two-dimensional data, for example, (1, 1) denotes that the entire network needs to produce tensors once to execute one batch of data. When a broadcasting node is inserted into the network, the tensor will be sent k times, and the number of times to produce tensors when the entire network executes a batch of data is (1, k). The optimization method for inferring the number of times to produce tensors when the entire network executes a single batch of data can statically allocate memory for the tensors required by the physical nodes of the entire network in advance, thereby improving the memory scheduling efficiency of the physical computation graph of the entire network.

Through the above steps, it completes the whole process implemented by the apparatus of generating neural network model computation-oriented intermediate representation. In the below, it shall test the apparatus of generating neural network model computation-oriented intermediate representation.

A classic and mainstream deep learning model ResNet-50 v1.5 is selected for the test, wherein ResNet-50 is the most mainstream deep learning model in the field of computer vision. There are 4 machines in the test environment, and each machine is equipped with 8 graphics cards having V100 GPUs. For a neural network model of a deep learning framework, a throughput rate thereof in a distributed environment is tested. The throughput rate represents the processing speed of the deep learning framework. The higher the throughput rate, the shorter the time required to train a deep learning model, and the higher the performance of the deep learning framework. The throughput rate specifically refers to the number of samples processed by the deep learning framework per second during the training process. For an image classification task, the throughput rate represents how many images are processed per second.

The test results are as follows:

TABLE 1

Test on an apparatus of generating neural network model computation-oriented intermediate representation

| Number of nodes | Number of devices | PyTorch | TensorFlow2.x | The apparatus of generating intermediate representation |
| --- | --- | --- | --- | --- |
| 1 | 1 | 348.62 | 321.80 | 390.64 |
| 1 | 8 | 2632.93 | 2458.74 | 3130.34 |
| 2 | 16 | 5115.40 | 4849.68 | 6260.10 |
| 4 | 32 | 10021.29 | 9418.44 | 12411.90 |

Unit: pictures/second

The test results show that in the ResNet50 model, the performance of the neural network model computation-oriented intermediate representation generation apparatus is better than other existing mainstream deep learning frameworks.

Figure 9:
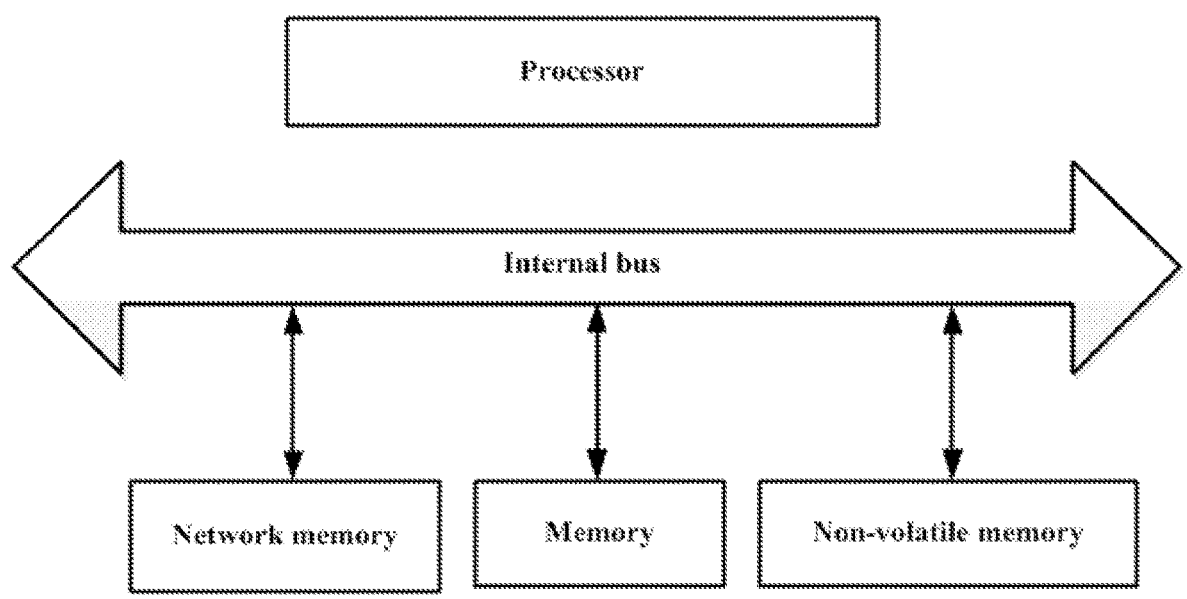

Referring to FIG. 9, an embodiment of the present disclosure further provides an apparatus of generating, further including a memory and one or more processors, wherein the memory stores executable codes, and when the one or more processors execute the executable codes, the method of neural network model computation-oriented intermediate representation according to above embodiments is implemented.

The embodiment of the apparatus of generating according to the present disclosure may be applied to any device with data processing capability, and any device with data processing capability may be a device or apparatus such as a computer. The apparatus embodiment may be implemented by means of software, or may be implemented by means of hardware or a combination of software and hardware. Taking implementation by software as an example, an apparatus in a logical sense is formed by reading a corresponding computer program instruction in a non-volatile memory into a memory by means of a processor of any device with data processing capability where the apparatus is located. From the perspective of hardware, FIG. 9 shows a hardware structure diagram of any device with data processing capability where an apparatus of generating in the present disclosure is located. In addition to a processor, a memory, a network interface and a non-volatile memory as shown in FIG. 9, any device with data processing capability where the apparatus in the embodiment is located may generally include other hardware according to the actual functions of any device with data processing capability, which will not be repeated here. For details of the implementation process of the functions and functions of units in the above apparatus, reference may be made to the implementation process of the corresponding steps in the above method, which will not be repeated here.

Since an apparatus embodiment basically corresponds to a method embodiment, for related parts, reference may be made to partial descriptions in the method embodiment. The apparatus embodiments described above are merely illustrative. The units described as separate components may be or may not be physically separated, and the components displayed as units may be or may not be physical units, that is, may be located in one place, or may be distributed to multiple network units. Some or all of modules may be selected according to actual needs to achieve the objectives of the solutions of the present disclosure. Those of ordinary skill in the art can understand and implement the present disclosure without doing any inventive effort.

An embodiment of the present disclosure further provides a computer-readable storage medium storing a program, wherein when the program is executed by a processor, the method of neural network model computation-oriented intermediate representation according to the above embodiments is implemented.

The computer-readable storage medium may be an internal storage unit of any device with data processing capability described in any of the foregoing embodiments, such as a hard disk or a memory. The computer-readable storage medium may also be an external storage device of any device with data processing capability, such as a plug-in hard disk, a smart media card (SMC), an SD card and a flash card equipped on the device. Further, the computer-readable storage medium may include not only an internal storage unit of any device with data processing capability and also an external storage device. The computer-readable storage medium is used for storing the computer program and other programs and data required by any device with data processing capability, and may also be used for temporarily storing data that has been output or will be output.

The above embodiments are merely preferred embodiments of the present disclosure and not intended to limit the present disclosure. Any modifications, equivalent substitutions, improvements, or the like made within the spirit and principles of the present disclosure shall fall within the scope of protection of the present disclosure.

What is claimed is:

1. A method of neural network model computation-oriented intermediate representation, comprising the following steps:
    S1, parsing an input model file so as to acquire topological structure information of a neural network by parsing a user-defined function body including input and output parameters, and compiling the user-defined function body into a logical computation graph composed of logical computation expressions, wherein the logical computation expressions are referred to as operators for short;
    S2, constructing the logical computation graph;
    S2.1, inferring physical layout information of each operator in the logical computation graph, wherein the physical layout information represents information of a corresponding machine and device to which each logical operator is to be deployed in the future during a process of constructing the logical computation graph;
    S2.2, inferring meta attributes of each operator in the logical computation graph, wherein the meta attributes of each operator in the logical computation graph refer to a mapping relationship between input and output tensors of each logical operator and input and output tensors of each physical operator;
    S2.3, inferring description information of input and output logical tensors of each operator in the logical computation graph, and inferring shape and data type information of the input and output logical tensors of each logical operator by using meta attributes of distribution information of each operator;
    S3, constructing a physical computation graph by generating the physical computation graph according to the logical computation graph;
    S3.1, generating each node of the physical computation graph;
    S3.2, generating input and output tensor edges of each node of the physical computation graph;
    S4, inferring information of the input and output tensor edges of each node in the physical computation graph;
    S5, executing a process of constructing each physical node;
    S6, designing a three-level memory structure of tensor edges in the physical computation graph;
    S6.1, allocating a whole block of a first-level memory at a time in advance before the physical computation graph is executed;
    S6.2, requesting a required second-level memory from the first-level memory by each subgraph execution engine during operation according to a memory offset corresponding to a memory size required by each subgraph of the physical computation graph, wherein the second-level memory is a sub-memory of the first-level memory;
    S6.3, requesting a memory required by the input and output tensor edges of each computation node in each subgraph of the physical computation graph from the second-level memory corresponding to the respective subgraphs, wherein the memory required by the tensor edges of each node is a third-level memory;
    S7, performing memory optimization on the tensor edges in the physical computation graph;
    S7.1, performing memory sharing on the tensor edges in the physical computation graph;
    S7.2, performing memory multiplexing on the tensor edges in the physical computation graph; and
    S8, optimizing the physical computation graph.

2. The method of neural network model computation-oriented intermediate representation according to claim 1, wherein the logical computation graph in the step S2.1 is a topological structure composed of logical computation expressions, which stores all nodes composed of computation expressions and tensor connection edges that are produced and consumed between the nodes in the logical computation graph.

3. The method of neural network model computation-oriented intermediate representation according to claim 1, wherein the meta attributes of each operator in the logical computation graph in the step S2.2 are a list of valid attributes included in each operator and refer to a mapping relationship between the input and output tensors of each logical operator and the input and output tensors of each physical operator, and the meta attributes.

4. The method of neural network model computation-oriented intermediate representation according to claim 3, wherein the meta attributes comprise the following three types of attributes:
    a splitting attribute, wherein the splitting attribute of each operator indicates that a physical tensor is obtained by splitting a logical tensor according to a specified dimension, the splitting attribute has parameters representing a splitting dimension, and the logical tensor may be restored by splicing multiple physical tensors according to the splitting dimension;
    a broadcasting attribute, wherein the broadcasting attribute of each operator indicates that a physical tensor is exactly the same as a logical tensor, and also indicates that each physical operator needs data of an entirety of the logical tensor; and
    a local summation attribute, wherein the local summation attribute of each operator indicates that a shape of a physical tensor is consistent with a shape of a logical tensor, but values in the physical tensor are part of those at corresponding positions in the logical tensor, and the logical tensor may be restored by adding multiple physical tensors according to the corresponding positions.

5. The method of neural network model computation-oriented intermediate representation according to claim 1, wherein the step S3.1 is: traversing each logical node of the logical computation graph, and generating physical computation nodes with a topological order according to physical layout information of each logical node.

6. The method of neural network model computation-oriented intermediate representation according to claim 1, wherein the step S3.2 is: traversing each logical tensor edge of the logical computation graph, and according to types of the front and back logical nodes, generating a connection edge of physical computation nodes corresponding to the logical nodes and a new node composition.

7. The method of neural network model computation-oriented intermediate representation according to claim 6, wherein generating the connection edge of the physical computation nodes corresponding to the logical nodes is as follows: traversing the physical layout information of currently connected two front and back nodes, and determining whether the two nodes are on a same device according to the physical layout information of the two nodes, using a one-to-one direct connection mode by an internal connection tensor edge when two connected physical nodes are on the same device; and inserting transmission nodes so as to enable a one-to-one directly connected target node to acquire a corresponding tensor when two physical computation nodes are not on the same device, the transmission nodes comprising a node copied from a device side to a host side, a network transmission node, and a node copied from the host side to the device side.

8. The method of neural network model computation-oriented intermediate representation according to claim 1, wherein the step S4 is as follows:
S4.1, generating an input tensor edge of each physical node, which refers to allocating an input tensor from a memory to each physical node, and binding the input tensor to the input tensor edge of each physical node; and
S4.2, generating an output tensor edge of each physical node, which refers to allocating an output tensor from the memory to each physical node, and binding the output tensor to the output tensor edge of each physical node.

9. The method of neural network model computation-oriented intermediate representation according to claim 1, wherein the sub-steps of the step S5 are as follows:
S5.1, constructing each physical node by creating a new physical node according to the operators in the logical computation graph;
S5.2, binding the input and output tensor edges of each physical node by maintaining one or more logical tensor identity fields inside a tensor consumed by the input tensor edge and a tensor produced by the output tensor edge of each physical node to identify one tensor, and binding the identity fields inside the tensor to the identity fields inside the logical node on a one-to-one basis during the construction of the physical node; and
S5.3, inferring description information of tensor edges in each physical computation graph by inferring description information of the tensor edges in each physical computation graph and storing the description information into corresponding tensor information.

10. The method of neural network model computation-oriented intermediate representation according to claim 1, wherein performing memory sharing on the tensor edge in the physical computation graph in the step S7.1 refers to that the output tensor edge of the physical node in the physical computation graph directly performs in-place computation in the memory of an original input tensor edge, and directly modifies the value of the input tensor of the physical node, and the process of performing memory sharing on the tensor edges in the physical computation graph comprises the following sub-steps:
S7.1.1, collecting memory-shared physical nodes by traversing all the nodes in the physical computation graph according to the topological order to find nodes that satisfy that there is an input-output relationship between two front and back nodes and are all in the same device, then marking a memory of the connection tensor edge between the two front and back nodes to be 0; in the case that there is no input-output relationship, marking the memory of the connection tensor edge between the two nodes to be 1, and then generating a marked physical node topological sequence according to the marked memory; and
S7.1.2, allocating shared memory, there being multiple nodes on each marked physical node topological sequence, checking whether there is a memory sharing operation between the input and output nodes, in the case that there is the memory sharing operation, making a memory sharing mark, and multiplexing an output of the current node by an input of the next node.

11. The method of neural network model computation-oriented intermediate representation according to claim 1, wherein performing memory multiplexing on the tensor edges in the physical computation graph in the step S7.2 refers to that for memories with non-overlapping life cycles, memory used later may multiplex the memory that has been used up earlier, and the step S7.2 includes steps as follows:
S7.2.1, constructing a mapping table of mutually exclusive memories, traversing all memories, acquiring a start point and an end point of a life cycle of each memory, reserving mutually exclusive points of two memories with overlapping life cycles, and constructing a hash table of mutually exclusive memories;
S7.2.2, allocating a multiplexed memory, wherein the multiplexed memory refers to a memory that satisfies a memory multiplexing condition, and the memory multiplexing condition refers to that the life cycles of the two memories do not overlap; the hash table of mutually exclusive memories constructed above is traversed; for two memories without mutual exclusion relationship, only one memory needs to be allocated, wherein the size of the allocated memory is equal to that of the larger one of the two memories, the smaller memory can multiplex the larger one of the two memories, and a label of the multiplexed memory is marked; and for two memories with mutual exclusion relationship, after a former memory is allocated, when a latter memory is allocated, the offset continues to be expanded to the size of the latter memory after the offset of the former memory.

12. The method of neural network model computation-oriented intermediate representation according to claim 1, wherein the sub-steps of the step S8 are as follows:
S8.1, removing an empty tensor edge; and
S8.2, inferring a number of times to produce tensors when the neural network executes a single batch of data, which indicates the number of times required to produce tensors when the neural network executes one batch of data.

13. An apparatus, comprising a non-transitory memory with instructions stored therein and one or more processors, wherein the one or more processors, when executing the instructions, perform the method according to claim 1.

* * * * *